Aug. 2, 1966     K. PLANTA     3,263,985
SHOCK ABSORBER
Filed Aug. 4, 1964
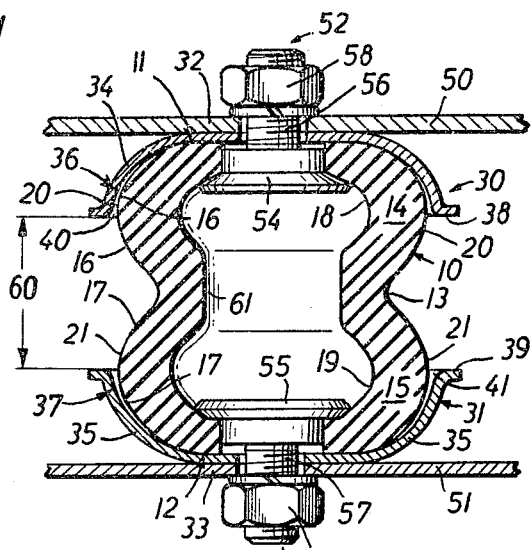
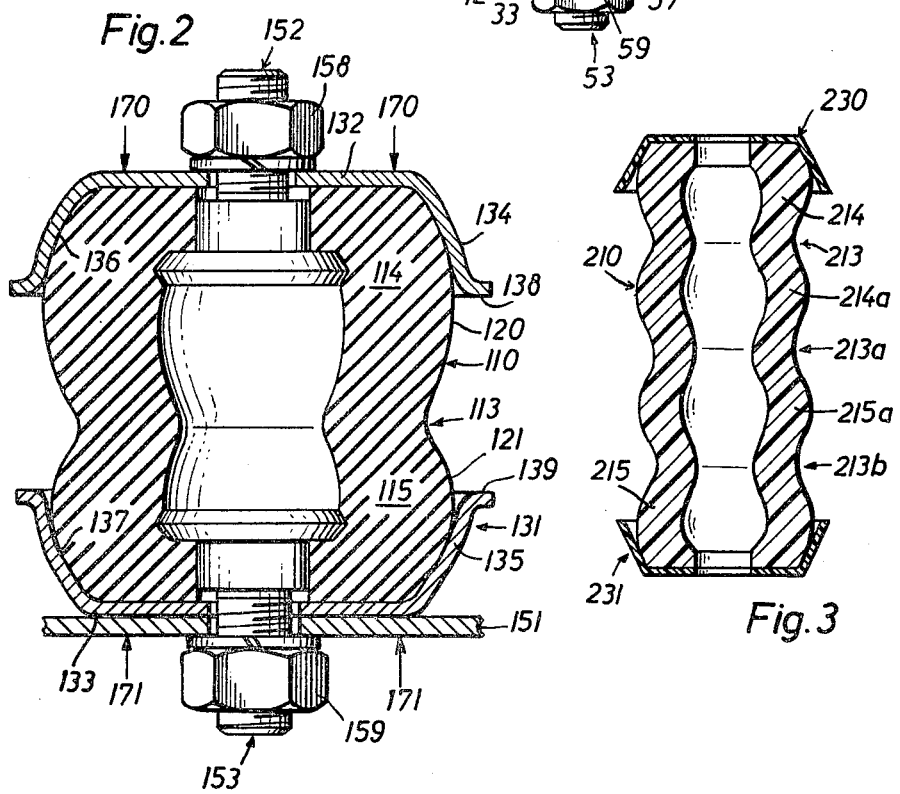
INVENTOR
KURT PLANTA
BY
*Michael J. Striker*
his ATTORNEY

United States Patent Office 3,263,985
Patented August 2, 1966

3,263,985
SHOCK ABSORBER
Kurt Planta, Wildenburgstrasse 22,
Cologne-Lindenthal, Germany
Filed Aug. 4, 1964, Ser. No. 387,282
Claims priority, application Germany, Aug. 7, 1963,
P 22,013
6 Claims. (Cl. 267—63)

The present invention relates to shock absorbers in general, and more particularly to improvements in shock absorbers of the type wherein a spring of rubber or other elastomeric material is sandwiched between a pair of rigid stress transmitting members.

It is already known to produce mechanical shock absorbers by placing a solid block-shaped or cylindrical spring of rubber or similar elastically deformable material between two end plates or disks and by bonding the end faces of the shock absorber to the adjacent faces of the plates to form a one-piece shock absorber which is used to take up and to damp vibratory and similar stresses acting in the axial direction of the spring i.e., at right angles to the planes of the end plates. A serious drawback of such shock absorbers is that the end plates tend to become separated from the spring in response to comparatively low transverse stresses, and also that the bonding operation requires much time, complicated machinery, and special treatment of surfaces which are to be vulcanized to each other. Moreover, the spring constant of such shock absorbers is not very satisfactory, especially when the load upon the shock absorber varies within a wide range.

Accordingly, it is an important object of the present invention to provide an improved shock absorber wherein the stress transmitting members need not be bonded or otherwise permanently secured to the spring which is capable of taking up very high axial stresses and substantial transverse stresses, which may be readily taken apart to facilitate replacement of a damaged component by a fresh component, which is of lightweight construction, which may be mass-produced at low cost, and which may be produced in any desired size to take up exceptionally high or comparatively low axial, transverse, torsional and/or other stresses.

Another object of the invention it to provide an improved spring which may be utilized with advantage in a shock absorber of the just outlined characteristics.

A further object of the instant invention is to provide improved stress transmitting members which may be utilized in the novel shock absorber.

An additional object of the invention is to provide a shock absorber with a spring of elastomeric material between a pair of rigid stress transmitting members wherein the configuration of the spring and of the stress transmitting members is such that the shock absorber may take up much higher transverse stresses than any conventional bonded shock absorbers of which I have knowledge at this time.

A concomitant object of the invention is to provide very simple and easy-to-handle mechanical connections between the stress transmitting members and the structure in which the improved shock absorber is put to use.

With the above objects in view, one feature of the present invention resides in the provision of a shock absorber comprising a tubular compression spring of natural rubber, synthetic rubber or other suitable elastomeric material. The spring is provided with two annular end faces which are preferably flat and parallel to each other and the spring comprises two end portions which are adjacent to the respective end faces and are bounded by preferably convex external surfaces whose diameters increase gradually in directions away from the respective end faces. The shock absorber further comprises two substantially cup-shaped rigid stress transmitting members each of which comprises an annular bottom wall which is adjacent to and whose aperture registers with the aperture in one of the end faces, and a preferably concavo-convex mantel which diverges outwardly from the corresponding end wall and whose internal surface surrounds with clearance the respective external surface to define therewith an annular gap of predetermined depth and of a width which increases gradually in a direction away from the nearest end face in uncompressed condition of the spring. The stress transmitting members are movable toward each other to compress the spring axially whereby the end portions expand radially to reduce the width and the depth of gaps by moving their external surfaces into increasing face-to-face abutment with the internal surfaces of the corresponding mantles.

The spring is preferably provided with at least one external annular construction so that each of its end portions resembles a barrel with a convex external surface whose halves are mirror symmetrical with reference to a plane which is perpendicular to the axis and is located midway between the ends of the barrel. The axial length of the mantles then approximates one-half the axial length of the adjacent barrel-shaped end portions. The axial length of one end portion may but need not be the same as that of the other end portion, and the end portions may be provided with internal annular recesses so that their wall thickness may be substantially constant from end to end. Such recesses may receive the heads of threaded bolts or similar fasteners which serves to couple the shock absorber to the chassis of an automotive vehicle, to the housing of a motor, to the subframe of a seat, to the housing of an appliance, or to another structure in which the shock absorber is put to use.

The novel features which are considered as characteristic of the invention are set forth in particular in the appended claims. The improved shock absorber itself, however, both as to its construction and its mode of operation, together with additional features and advantages thereof, will be best understood upon preusal of the following detailed description of certain specific embodiments with reference to the accompanying drawings, in which:

FIG. 1 is an axial section through a shock absorber which is constructed in accordance with a first embodiment of my invention and whose spring is provided with a single centrally located external annular constriction, the spring being shown in uncompressed condition;

FIG. 2 is a similar section through a slightly modified shock absorber whose spring is provided with a single external annular construction which is nearer to one of its ends, the spring being shown in compressed condition; and FIG. 3 is a somewhat schematic axial section through a third shock absorber wherein the spring is provided with a plurality of external constrictions.

Referring to FIG. 1, there is shown a shock absorber which comprises a tubular spring 10 of natural rubber, synthetic rubber or other suitable elastomeric material. This spring has two flat parallel annular end faces 11, 12 and an annular external constriction 13 which is located exactly or nearly exactly midway between the end faces 11, 12. The constriction 13 serves to subdivide the body of the spring into a pair of barrel-shaped end portions 14, 15 each of which is adjacent to one of the end faces 11, 12 and each of which is provided with a convex external surface 16 respectively 17 which diverges outwardly in a direction away from the nearest end face. The end portions 14, 15 are further provided with internal annular recesses 18, 19 so that their wall thickness is approximately constant and that the weight of the spring is reduced.

The reference numerals 20, 21 indicate the central sections of the convex external surfaces 16, 17 and such central sections are located substantially midway between the axial ends of the respective end portions.

The shock absorber further comprises two substantially cup-shaped rigid stress transmitting members 30, 31 which may consist of steel, another metal or synthetic plastic material. Each of these stress transmitting members (hereinafter called cup) comprises an annular bottom wall 32, 33 which is adjacent to the respective end face 11, 12 and a concavo convex mantle 34, 35 having a concave internal surface 36, 37 which surrounds one half of the respective end portion. The open ends 38, 39 of the mantles 34, 35 respectively surround the maximum diameter sections 20, 21 of the external surfaces 16, 17. It will be noted that the external surfaces 16, 17 and the corresponding internal surfaces 36, 37 respectively define between themselves two annular gaps 40, 41 whose cross sections resemble sickles and whose width increases gradually in a direction away from the respective end face. The depth of the recesses 40, 41 in uncompressed condition of the spring 10 is determined in advance by proper configuration of the surfaces 16, 17, 36 and 37.

The shock absorber is mounted between a pair of plate-like structural members 50, 51 whose apertures register with the apertures in the adjacent bottom walls 32, 33 and in the corresponding end faces 11, 12. The means for coupling the shock absorber to the structural member 50, 51 comprises two bolt-like fasteners 52, 53 each having a head 54 respectively 55 which is received in the corresponding recess 18, 19, and an externally threaded stem 56 respectively 57 extending axially outwardly so as to project through the adjacent annular end face, through the adjacent bottom wall and through the adjacent structural member. The ends of the stems 56, 57 mesh with nuts 58, 59. The axial length of the heads 54, 55 is such that they remain spaced from each other even if the spring 10 undergoes maximum compression, i.e. if the open ends 38, 39 of the mantles 34, 35 come in actual abutment with each other at the time the axial length of the spring 10 is reduced by a distance 60. When the spring 10 undergoes an average maximum axial compression (i.e., a maximum compression which is normally anticipated when the shock absorber is used for a given purpose), the end portions 14, 15 will expand radially to move their external surfaces 16, 17 in full face-to-face abutment with the internal surfaces 36, 37 so that the width and the depth of each of the gaps 40, 41 is reduced to zero. In other words, the mantles 34, 35 are then completely filled with the material of the respective end portions.

There is no need to guide the cylindrical internal surface 61 of the spring 10 when the latter undergoes axial compression. Thus, there is no need to provide telescoped guides or the like which extend all the way through the entire interior of the spring. Such guides are undesirable when the shock absorber is used in refrigerators, in the bodies of automotive vehicles and for similar purposes because they invariably transmit at least some noise. Also, and particularly at the time the mantles 34, 35 are filled with the material of the end portions 14, 15, the shock absorber will be capable of taking up substantial transverse stresses, i.e., stresses which act in the radial direction of the spring 10. During axial compression, the constriction 13 narrows gradually and might disappear completely when or even before the open ends 38, 39 come in actual abutment with each other.

It will be understood that the spring 10 will yield more readily to axial stresses as long as the end portions 14, 15 are free to expand radially and into increasing face-to-face abutment with the mantles 34, 35. However, the resistance of the spring 10 to further axial compression increases substantially when the mantles are filled, and this is important in many applications of the shock absorber when the latter should serve as a cushion to take up all lighter stresses but must offer very high resistance to maximum permissible and/or to excessive axial stresses.

The shock absorber of FIG. 2 is very similar to the just described shock absorber with the important difference that the axial length of the lower barrel-shaped end portion 115 is less than the axial length of the upper barrel-shaped end portion 114. Also, the shock absorber of FIG. 2 is shown in a condition when it undergoes maximum average compression (see the arrows 170, 171) so that the gaps between the convex external surfaces of the end portions 114, 115 and the concave internal surfaces of the mantles 134, 135 have disappeared completely. The spring 110 is provided with a single external annular constriction 113, and the shock absorber is connected to a single structural element 151 which is detachably secured to the lower cup 131 by a bolt 153 and 159. The stresses which are transmitted to the upper end portion 114 of the spring 110 act against the exposed side of the upper bottom wall 132.

An important advantage of the shock absorber which is shown in FIG. 2 is that the resistance to axial compression increases more gradually. Thus when the spring 110 undergoes axial compression, the lower end portion 115 will normally fill the lower mantle 135 before the upper mantle 134 is filled with elastomeric material. As the compression continues, the upper mantle 134 is gradually filled with the material of the upper end portion 114 and, in such condition, the shock absorber will be capable of taking up very high transverse (radial or substantially radial) stresses. By properly selecting the axial position of the constriction, the manufacturer may determine the exact configuration of the characteristic curve for the spring 110.

All other reference numerals shown but not mentioned in connection with FIG. 2 correspond to those which are shown in FIG. 1 but each such numeral is preceded by the digit "1."

FIG. 3 illustrates a third shock absorber which comprises a tubular spring 210 having three axially spaced external annular constrictions 213, 213a, 213b so that the body of the spring is subdivided into as many as four coaxial barrel-shaped portions including two end portions 214, 215 and two intermediate portions 214a, 215a. The end portions 214, 215 cooperate with two cups 230, 231 in the same way as described in connection with FIG. 1. The spring 210 is shown in uncompressed condition. The bolts and nuts which may be used to couple the shock absorber to the chassis of an automotive vehicle or the like are not shown in FIG. 3. The spring 210 and the cups 230, 231 respectively consist of elastomeric and rigid synthetic plastic material.

Shock absorbers of the type shown in FIGS. 1 to 3 may be used with particular advantage in many types of automotive vehicles to serve as cushions between the chassis and the wheels and/or axles. However, such shock absorbers may be used with equal advantage to take up shocks between a motor and its underframe as well as in many other instances where the shock absorber is used predominantly to take up substantial axial or axially parallel and, to a lesser degree, radial and/or twisting stresses. The mantles of the cups serve to prevent buckling of the tubular spring in response to undesirably high transverse stresses. Thus, and while a very large and reasonably hard tubular spring could be said to be capable of resisting substantial transverse stresses without the assistance from cup-shaped stress transmitting members, such large spring would occupy too much room which is not available in many types of structures where a mechanical shock absorber is used. On the other hand, by combining a comparatively weak and small tubular spring with a pair of substantially cup-shaped stress transmitting members, I insure that the spring can resist very high buckling stresses, i.e., buckling stresses of a magnitude which cannot be absorbed by the spring alone. In other words, a very important advantage of my improved shock absorber is that a comparatively weak tubular spring may resist very high transverse and other buckling or twisting stresses because the rigid cups assist the spring particularly at such times when the spring has undergone at least some axial compression. As the width and the depth of a gap between a cup and the corresponding end portion of the spring increases, the spring is capable of resisting progressively increasing transverse stresses and, since such transverse stresses often increase simultaneously with axial stresses, the shock absorber of my invention presents a highly satisfactory solution in many types of automobiles, appliances and other structures where axial stresses arise simultaneously with transverse stresses. It is to be noted that, and particularly when the shock absorber of my invention is used primarily to take up axial stresses, the gaps between the external surfaces of the end portions on the tubular spring and the internal surfaces of the adjacent mantles may be dimensioned in such a way that such gaps do not disappear entirely when the spring undergoes maximum axial compression. In other words, all that is important when the spring is intended to take up stresses which act predominantly in the axial direction of the shock absorber is to provide gaps whose depth and width will diminish in respond to progressing reduction in the axial length of the spring.

Since the improved shock absorber need not be provided with centrally located guides which extend all the way between the end faces of the spring, and since the coupling devices which secure the shock absorber to a supporting structure need not be connected to each other, the spring need not undergo preliminary compression when its end portions are assembled with the cups. Therefore, the spring will remain "soft" and will readily react to very small axial stresses which is of importance in many applications of the shock absorber. The shock absorber may be fully assembled in the manufacturing plant or at the locale of actual use. This is possible because the cups need not be vulcanized to the end faces of the spring which results in lower cost and longer useful life of the shock absorber. Any damaged or destroyed component of the shock absorber may be replaced by semiskilled persons so that the remaining components need not be discarded just because a single part happens to be defective.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A shock absorber, comprising a tubular compression spring of elastomeric material, said spring having two annular end faces and end portions adjacent to said end faces, said end portions being bounded by external surfaces whose diameters first increase in directions away from the respective end faces to provide respective sections of maximum external diameter, and then decrease to provide at least one section of an external diameter less than said maximum external diameter; and a pair of substantially cup-shaped rigid stress transmitting members each having a bottom wall adjacent to one of said end faces and a mantle diverging outwardly from the respective bottom wall and surrounding with clearance the corresponding external surface to define therewith an annular gap of predetermined depth and of a width which increases in a direction away from the respective end face in uncompressed condition of said spring, said mantles extending at least to and surrounding the maximum-diameter sections of the respective external surfaces and said members being movable toward each other to compress the spring whereby said end portions expand radially to reduce the width and the depth of said gaps and to move their external surfaces into increasing face-to-face abutment with the corresponding mantles.

2. A shock absorber as set forth in claim 1, wherein said end portions expand radially and fill the corresponding mantles substantially all the way in response to a maximum average compressive stress upon said spring.

3. A shock absorber, comprising a tubular compression spring having a constant wall thickness and being made from elastomeric material, said spring having two annular end faces and at least one external annular constriction subdividing said spring into a plurality of coaxial portions including two substantially barrel-shaped end portions each of which is adjacent to one of said end faces, said end portions having convex external surfaces diverging gradually in directions away from the respective end faces and having sections of maximum diameter located substantially midway between the axial ends of the respective end portions; and a pair of substantially cup-shaped rigid stress transmitting members each including a bottom wall adjacent to one of said end faces and a mantle having an internal surface diverging having a free edge portion surrounding the respective section of maximum diameter, said internal surfaces with clearance the external surface of the corresponding end portion, said mantle extending at least to and surrounding the respective section of maximum diameter of said spring and defining with said externals surface of the corresponding end portion an annular gap of predetermined depth and of a width which increases toward the respective free edge portion section of maximum diameter in uncompressed condition of said spring, said members being movable toward each other to compress the spring axially whereby said end portions expand radially to reduce the depth and width of said gaps and to move their external surfaces into increasing face-to-face abutment with the internal surfaces of the corresponding mantles.

4. A shock absorber as set forth in claim 3, wherein the axial length of one of said end portions exceeds the axial length of the other end portion.

5. A shock absorber, comprising a tubular compression spring of elastomeric material, said spring having two annular end faces and a plurality of external annular constrictions subdividing said spring into at least three coaxial barrel-shaped portions including two end portions each of which is adjacent to one of said end faces, said end portions having convex external surfaces diverging gradually in directions away from the respective end faces and having sections of maximum diameter located substantially midway between the axial ends of the respective end portions; and a pair of substantially cup-shaped rigid stress transmitting members each including a bottom wall adjacent to one of said end faces and a mantle having an internal surface diverging outwardly from the respective bottom wall, said members each having a free edge portion surrounding the respective section of maximum diameter, said internal surfaces surrounding with clearance the external surface of the corresponding end portion and extending at least to and surrounding the respective section of maximum diameter, said members thereby defining with the respective external surface an annular gap of predetermined depth and of a width which increases toward the respective section of maximum diameter in uncompressed condition of said spring, said members being movable toward each other to compress the spring axially whereby said end portions expand radially to reduce the depth and width of said gaps and to move their external surfaces into increasing face-to-face abutment with the internal surfaces of the corresponding mantles.

6. A shock absorber, comprising a tubular compression spring of elastomeric material, said spring having two annular end faces and end portions adjacent to said end faces, said end portions being bounded by external surfaces whose diameters increase in directions away from the respective end faces, and each end portion having a section of maximum diameter located substantially midway between the axial ends of the respective end portion, each end portion further having an internal annular recess adjacent to the respective end face and said spring having intermediate said sections of maximum diameter a reduced external diameter; a pair of substantially cup-shaped rigid stress transmitting members each having an annular bottom wall adjacent to one of said end faces and a mantle diverging outwardly from the respective bottom wall and surrounding with clearance the corresponding external surface to define therewith an annular gap of predetermined depth and of a width which increases in a direction away from the respective end face in uncompressed condition of said spring, said members each having a free edge portion surrounding the respective section of maximum diameter and to compress the spring whereby said end portions expand radially to reduce the width and the depth of said gaps and to move their external surfaces into increasing face-to-face abutment with the corresponding mantles; and coupling means comprising a pair of elongated fasteners each having a head received in one of said recesses and a stem extending through and beyond the corresponding end face and through and beyond the corresponding bottom wall.

References Cited by the Examiner

UNITED STATES PATENTS

| | | | |
|---|---|---|---|
| 107,036 | 9/1870 | Gardiner | 267—63 |
| 168,845 | 10/1875 | Pratt | 267—63 |
| 1,705,037 | 3/1929 | Taub | 267—63 |

FOREIGN PATENTS

| | | |
|---|---|---|
| 1,024,478 | 4/1953 | France. |
| 1,157,837 | 6/1958 | France. |
| 1,276,628 | 10/1961 | France. |
| 1,283,406 | 12/1961 | France. |
| 672,163 | 2/1939 | Germany. |
| 196,154 | 4/1923 | Great Britain. |
| 698,322 | 10/1953 | Great Britain. |

ARTHUR L. LA POINT, *Primary Examiner.*

H. R. FIELD, R. M. WOHLFARTH,
*Assistant Examiners.*